July 1, 1941. E. B. NICHOLS 2,247,558
METHOD OF INLAYING
Filed May 12, 1937

Inventor
Edgar B. Nichols

Patented July 1, 1941

2,247,558

UNITED STATES PATENT OFFICE 2,247,558

METHOD OF INLAYING

Edgar B. Nichols, Moorestown, N. J.

Application May 12, 1937, Serial No. 142,174

5 Claims. (Cl. 18—59)

This invention relates to a method of inlaying in plastic materials, and while described in connection with tubular plastics, it is to be understood that the invention is not limited to such application, as the disclosure in this respect is merely illustrative for purposes of explaining the inventive concept.

The finished product of this method of inlaying results in a means securely and neatly inlaid in a plastic substance which is adapted to receive a member or series of members in the form of designs, initials or the like, substantially flush with the surface of the plastic material in which they are inlaid or embedded.

The primary object of the invention resides in the method of inlaying in such manner that the inlay is permanent and not subject to dislodging through normal temperature changes or contact therewith as might be encountered when such inlay is applied to a writing instrument or the like.

Another object resides in eliminating the usual necessary practice, with initialed goods for example, of inlaying various series of three-letter monograms in plastic articles, which renders certain of the articles unsalable until and unless said monograms can be changed, which through any methods heretofore employed would be expensive procedure; whereas the present invention provides an inlay with members adapted to receive any combination of initials or designs to suit each individual requirement, or permit change thereof without removal of the inlay.

Another object is to provide a combination inlay which is quickly and inexpensively manufactured and applied and which presents a highly attractive embellishment to the article on which it is applied.

Certain details of construction, together with other objects and advantages, will be apparent and the invention itself will be best understood by reference to the following specification and to the accompanying drawing, wherein.

Figure 1:
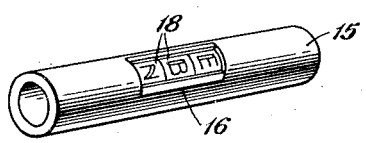
Fig. 1 illustrates the inlay assembly in applied position on a tube of plastic material.
Figure 2:
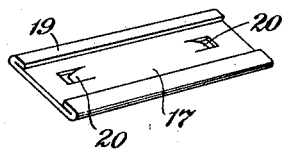
Figs. 2 and 3 illustrate steps in the forming of the inlay.

Referring to the drawing, and more particularly to the form of my invention illustrated in Figures 1 to 7 inclusive, the reference character 15 designates a plastic member or tube upon which my invention is shown applied in its entirety (Fig. 1) and is designated generally as 16.

Basically the latter comprises two members, an inlay or runner 17 and design members 18.

Prior to attaching the design members 18, which are shown as initials, the runner 17 is provided with return-bend flanges 19 and lugs 20 pierced from the body of the runner and bent to protrude at an angle on the runner face opposite to that on which said flanges 19 lie.

Figure 3:
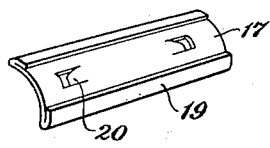

The runner 17 is next formed, as shown in Fig. 3, and on a radius of slightly less dimension than that of the exterior of the plastic tube in order that the flanges 19 of the runner will lie flush with the circumference of the tube when applied in the manner set forth hereinafter.

Figure 4:
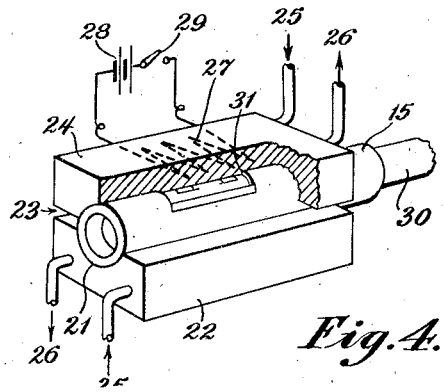
Fig. 4 illustrates, diagrammatically, the method of imbedding the inlay.

As illustrated in Fig. 4, the runner 17 is placed axially on the tube 15 with the lugs 20 resting against the tube, whereupon these units are placed in the semi-cylindrical bore or trough 21 of the base 22 of the inlaying mould or fixture 23, the said base 22 of which, as well as the upper portion or head 24 of the fixture, is provided with water inlets and exhausts 25 and 26, respectively, while said head 24 is further provided with a suitable heating element 27, which is preferably an electrical resistance supplied with current from a source of energy 28 controlled by a switch 29.

A mandrel 30 is projected into the tube 15, prior to bringing the fixture parts to the position shown in Fig. 4, to prevent collapse of the tube during the compression of inlaying. It will be noted that a step 31 is provided in the fixture head 24 in order that the runner 17 proper will be forced uniformly against the tube body when the lugs 20 penetrate the tube as the steps set forth hereinafter are being carried out.

While the lugs 20 insure positive locking in the finished product, it is nevertheless sometimes desirable during assembly to coat the back of the runner with an adhesive in order to assure a neat and uniform alignment of the runner with the tube.

The first operation of the mould or fixture 23 is to bring the head 24 lightly into engagement with the runner and tube, whereupon the heating element 27 is thrown into operation for a sufficient time to render the upper portion of the tube in a semi-plastic state. The head is then forced to its closed position against the base 22 and the heating element shut off. This operation has forced the runner into the tube 15 to the depth shown in Figs. 5 and 6 and the lugs 20 into the walls of the tube. Attention is directed to the fact that the tube is sufficiently molten to permit said lugs to imbed without changing their angle and consequently, as clearly shown in Fig. 5, they become locked in the tube and can not be removed without reheating the tube.

The next operation introduces a cooling medium through the inlet and outlet tubes 25 and 26 of the fixture to restore the temperature and condition of the parts to normal.

Upon reaching such predetermined temperature the head 24 rises to release the tube and the mandrel is removed. The inlay is then complete and is in condition for receiving the inserts or initials 18.

Figure 6:
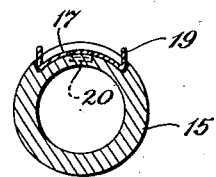
Fig. 6 is a sectional view transverse to Fig. 5 showing the inlay in position to receive the design inserts.
Figure 7:
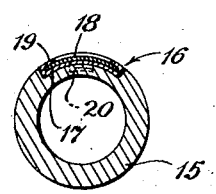
Fig. 7 is a like view with inserts in place and locked by the inlay.

This is accomplished by means of a knife edged tool which raises the flanges 19 of the imbedded runner 17 to the position shown in Fig. 6, whereupon the initials 18 are then placed against the front face of the runner and the flanges 19 folded or bent back into position over the initials as shown in Fig. 7 and the article is complete as illustrated in Fig. 1.

It will therefore be appreciated that articles upon which monograms are desired can have the same with the required initials inserted at the time of procuring the article in lieu of the method of attempting to secure an article upon which the desired initials or design happen to be.

Further, it is deemed apparent that the preferred embodiment of my invention provides a new and novel as well as inexpensive means of providing an attractive inlay which presents no objectionable projections and is capable of having applied thereto any initial or design or combination thereof as desired, limited only by the predetermined dimension of the inlay or runner element.

Figure 8:
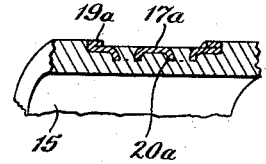
Figs. 8 and 9 are detail views of a modified inlay.
Figure 9:
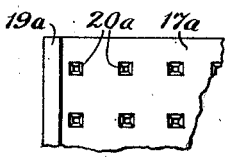

In the form of my invention shown in Figs. 8 and 9, the inlay runner 17a is shown applied to the tube 15 and locked thereinto by pierced swages 20a which serve to anchor the runner 17a to the tube 15 in the manner of the lugs 20 of the foregoing embodiment. Said runner 17a is also provided with flanges 19a transverse to the axis of the tube for appearance variation and adapted to be opened to receive, and closed to lock, members similar to 18 in position therein, as is believed apparent without further detailed description.

Figure 10:
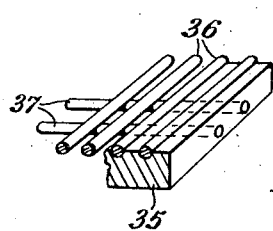
Fig. 10 is a perspective sectional detail of a further modification of inlay.
Figure 5:
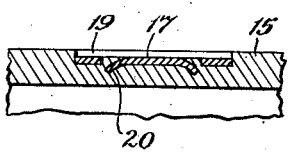
Fig. 5 is a longitudinal detail sectional view of the finished inlay.

Fig. 10 illustrates a novel method of securing the effect of bars or rods being half-submerged or embedded in the surface of the plastic element 35. This is accomplished by a layer of rods 36 being secured to a second or under series 37 and in turn moulding the latter to a depth sufficient to leave the upper series 36 half exposed as shown. The lower series 37 is therefore locked in the plastic 35, while the upper rods 36 are held securely in place by reason of their attachment to the lower rods.

This invention is not intended to be restricted in scope to the specific embodiments shown, but contemplates such modifications as are within the spirit of the appended claims.

I claim:

1. The method of securing an inlay to a member of normally hard, plastic material which comprises forming anchoring means on said inlay, placing said inlay against said member with said anchoring means in contact with said member, applying sufficient heat to said member only locally in the vicinity of said inlay to cause said member to soften in said vicinity, causing the softened portion of said member to flow around and surround said anchoring means, and finally cooling said member to restore it to hardened condition whereby said inlay becomes anchored to said member.

2. The method of securing an inlay to a member of normally hard, plastic material which comprises forming anchoring means on said inlay, placing said inlay against said member with said anchoring means in contact with said member, applying sufficient heat to said member only locally in the vicinity of said inlay to cause said member to soften in said vicinity, pressing said inlay into the softened portion of said member to cause said anchoring means to become embedded therein, and finally cooling said member to restore it to hardened condition whereby said inlay becomes anchored to said member.

3. The method of securing an inlay to a member of normally hard, plastic material which comprises forming anchoring means on said inlay, placing said inlay against said member with said anchoring means in contact with said member, applying sufficient heat to said member only locally in the vicinity of said inlay to cause said member to soften in said vicinity, thereafter applying sufficient pressure to said inlay to cause the adjacent surfaces of said inlay and said member to contact and said anchoring means to become embedded in said member, and finally cooling said member to restore it to hardened condition whereby said inlay becomes anchored to said member.

4. The method of securing an inlay to a member of normally hard, plastic material having a curved surface which comprises curving said inlay on a radius slightly smaller than the radius of curvature of said surface, applying said curved inlay to said surface, applying sufficient heat to said inlay and only locally to the adjacent portion of said member to cause said member to soften in the vicinity of said inlay, thereafter applying sufficient pressure to said inlay to force said inlay against said surface and cause said inlay to conform to the curvature of said member, and finally cooling said member to restore it to hardened condition.

5. The method set forth in claim 4 characterized in that said inlay is provided with anchoring means facing said member when said inlay is applied thereto, and characterized further in that the application of pressure to said inlay forces said anchoring means into the softened plastic material to become embedded therein and subsequently anchored thereto when said member is finally cooled.

EDGAR B. NICHOLS.